Figure 1:
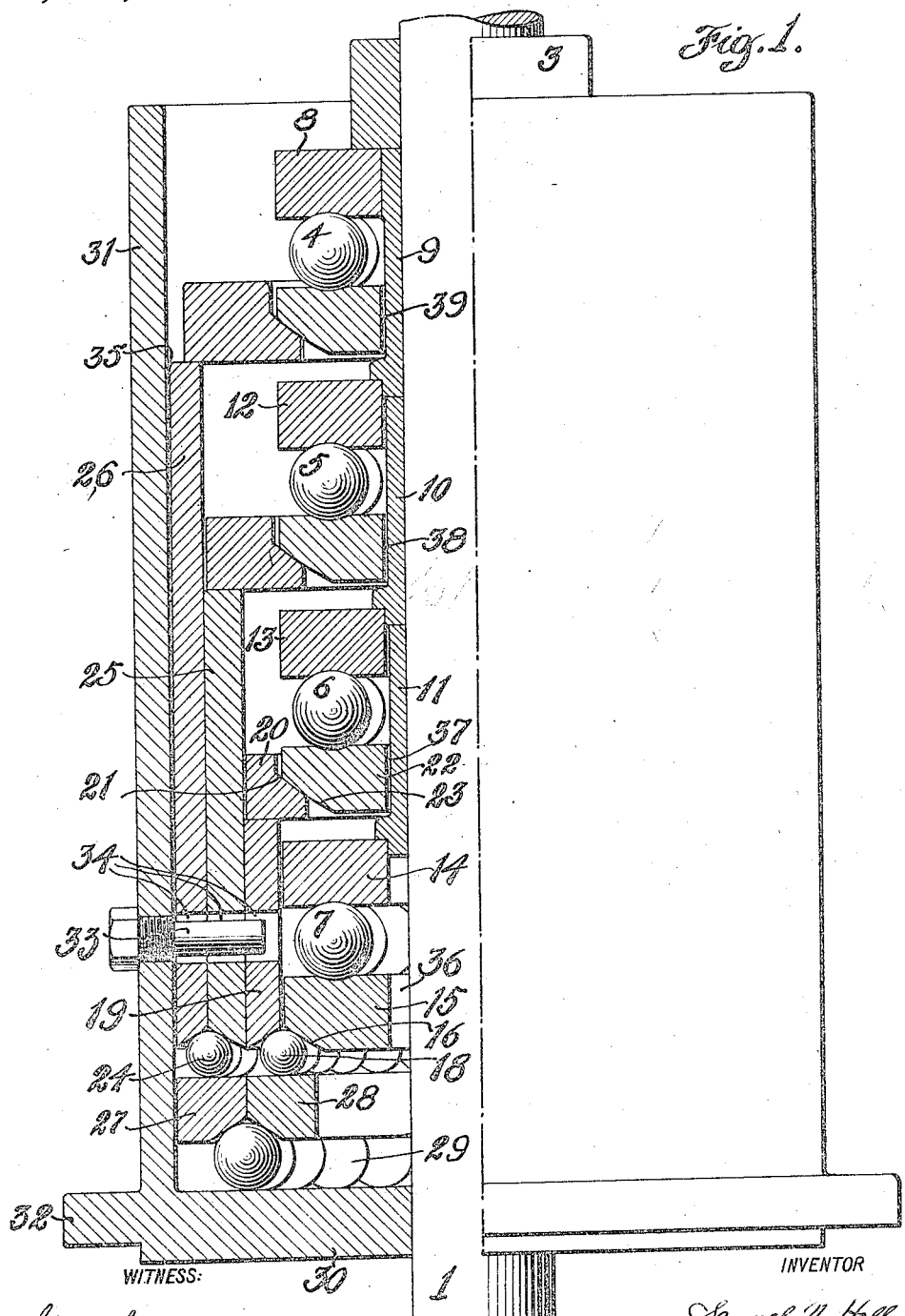

S. N. HALL.
THRUST BEARING.
APPLICATION FILED AUG. 16, 1920.

1,424,640.

Patented Aug. 1, 1922.

WITNESS:
Gustav Genzlinger.

INVENTOR
Samuel N. Hall
BY
Synnestvedt & Lechner
ATTORNEYS

UNITED STATES PATENT OFFICE.

SAMUEL N. HALL, OF LOS ANGELES, CALIFORNIA.

THRUST BEARING.

1,424,640.　　　　Specification of Letters Patent.　　Patented Aug. 1, 1922.

Application filed August 16, 1920. Serial No. 403,913.

*To all whom it may concern:*

Be it known that I, SAMUEL N. HALL, a citizen of the United States, residing at Los Angeles, in the county of Los Angeles and State of California, have invented certain new and useful Improvements in Thrust Bearings, of which the following is a specification.

This invention relates to devices for receiving the thrust loads of revolving shafts and is particularly useful in connection with deep well pumps of the rotary or impeller type where the weight of the shafting for driving the impeller blades must be supported from the surface of the ground. The principal object of the invention is to provide in a device of the character described, a plurality of bearings and to distribute the load equally among them. Other objects more closely associated with the specific and actual structure now to be described will appear.

Referring to the drawing, the Figure is a partial side elevation and vertical section through a thrust bearing embodying my invention.

The rotating shaft 1 is the shaft which carries the load, the thrust of which is to be distributed among the four sets of ball bearings Nos. 4, 5, 6 and 7. The load is transmitted through the collar 3, firmly fixed to the shaft above the bearings, directly to the upper ring 8 of the bearing 4 and through the sleeves 9, 10 and 11 to the upper rings 12, 13 and 14 of the bearings 5, 6 and 7. With respect to bearing 7, its load is transmitted through the lower ring or bearing plate 15, provided with the chamfered outer lower edge 16 which bears upon a series of balls 18. The chamfered portion is so cut and the balls are so placed that pressure through the bearing 7 tends to move the balls outwardly against the oppositely chamfered end of the sleeve or bushing 19 which surrounds the bearing 7 and extends upwardly to the ring 20 immediately below the bearing 6. This ring 20 is cut away as shown at 21 to form an inclined seat. The lower ring or bearing plate 22 of the bearing 6 is provided with a similarly inclined lower outer face 23 adapted to ride upon the face 24 of the ring 20. It will thus be seen that as between bearings 6 and 7, the load is equalized through the medium of the structure just described. Should, for instance, there be any inequality in the proportionate length of the parts associated with bearing 6 with respect to the parts associated with bearing 7, an equalization between the two bearings will take place through the medium of the series of balls 18. If bearing 6 and its bushing 19 is slightly longer than it should be in order to properly equalize the load between itself and bearing 7, it will push the balls 18 inwardly toward the chamfered face 16 of the bearing plate 15 of bearing 7, and a balance or equalization will quickly result.

Equalization is maintained between bearings 4 and 5 through the medium of the series of balls 24 in identically the same manner in which it was maintained between bearings 6 and 7, with the exception that the lower bearing 5, as well as the upper bearing 4 is provided with a bushing, inasmuch as its load must be transmitted past bearings 6 and 7 to a point in the same horizontal plane in which the balls 18 are located, this latter for a purpose to be described below. Bushing 25 is associated with bearing 5, and bushing 26 is associated with bearing 4. It will be noted that beginning from the outer bushing 26 each of the inner bushings and their respective bearings are enclosed by the outmost one. Bushing 26, for example, encloses bearings 5, 6 and 7, and all their associated parts. This construction could be utilized, it will be readily apparent, to provide equalization among a greater number of bearings than four, should it be so desired.

Between the two sets of bearings 4 and 5 and 6 and 7, I provide a further equalizing means in the shape of the two rings 27 and 28 upon which bear the two sets of balls 24 and 18 respectively. These two rings have their inner or abutting faces chamfered at the lower corners as shown. They bear upon the series of balls 29 and operate in exactly the same manner to equalize the load between the two sets of bearings as the balls 24 and 18 operate to equalize the load between the individual bearings of the sets.

The whole thrust load is carried on the base or floor 30 of the cup shaped housing 31 which extends upwardly to completely enclose all of the bearings and their associated parts, and provide, at the same time, a very good reservoir for lubricant. The flange 32 is adapted to rest upon a suitable support not shown.

In order to prevent any possible rotation of the various bushings employed, a pin 33 is provided which is threaded into the upright wall of the housing 31 and extends through a series of holes 34 in the bushings. These holes must be somewhat greater in diameter vertically than the diameter of the pin, as shown, in order to permit of any up or down movement of the bushings which may take place.

As a means for providing a circulation of lubricant within the housing 31, a slight space 35 is left between the inner face of the housing and the outer face of the outside bushing 26, and oil ways 36, 37, 38 and 39 are provided in the rings or bearing plates of the bearings 4, 5, 6 and 7.

It will be apparent that the balls 24, 18 and 29 do not revolve, their function being purely an equalizing one and any movement they may be called upon to make being only a slight radial movement inwardly or outwardly from the shaft 1 as the case may be. On the other hand, the balls 4, 5, 6 and 7 of the bearings proper will tend to move much in the usual manner, common to bearings of this character.

I claim:

1. In thrust load receiving devices having a plurality of bearings each comprising relatively rotating members, the combination of means for equalizing the load among the bearings comprising a series of balls disposed between oppositely inclined annular faces of the parts of a pair of bearings in such manner as to be moved radially by the bearing carrying the greater portion of the load against the bearing carrying the lesser, thereby obtaining an equalization of the load between them.

2. In thrust load receiving devices, the combination of a plurality of bearings each comprising relatively rotating members, means for transmitting a portion of the load to each bearing, annular means for transmitting that portion carried by each bearing to a series of balls arranged circumferentially of the bearings, said last means in adjacent bearings having oppositely inclined surfaces where they rest upon the balls, so that by radial movement the balls will permit of relative vertical movement between the load transmitting means of two adjacent bearings.

3. In thrust load receiving devices, the combination of a pair of bearings each comprising relatively rotating members, and each receiving a portion of the load, an annular series of load supporting balls, means associated with each bearing adapted to rest upon opposite sides of said balls and oppositely inclined surfaces on said means at the points where they rest upon the balls.

4. In thrust load receiving devices, the combination of a plurality of bearings arranged in pairs and each comprising relatively rotating members, means for equalizing the load between the individual bearings of each pair, and means for equalizing the load between pairs, each of said equalizing means consisting of a plurality of radially movable balls arranged circumferentially between oppositely inclined annular faces of the respective parts so as to permit of relative compensating movement between the parts.

5. In thrust load receiving devices, the combination of a shaft, a support for receiving the thrust of the shaft, a plurality of bearings between the shaft and the support for receiving the thrust of the shaft, each comprising relatively rotating members, annular members between the bearings movable relatively to each other longitudinally of the shaft, and balls between the first members movable radially upon such longitudinal movement of the first members.

6. In combination, a revolving shaft, a support for the shaft, a pair of annular bearings between the shaft and the support, and means for equalizing the load between the bearings comprising circumferentially arranged balls upon which the loads of the bearings are carried upon opposite sides of the vertical center line of the balls.

In testimony whereof, I have hereunto signed my name.

SAMUEL N. HALL.